United States Patent [19]
Hamilton et al.

[11] Patent Number: 5,675,102
[45] Date of Patent: Oct. 7, 1997

[54] METHOD OF ASSEMBLING A HYBRID INFLATOR AND RELATED PROPELLANTS

[75] Inventors: Brian K. Hamilton, Littleton; James L. Baglini, Englewood, both of Colo.

[73] Assignee: OEA, Inc., Aurora, Colo.

[21] Appl. No.: 584,461

[22] Filed: Jan. 11, 1996

Related U.S. Application Data

[60] Division of Ser. No. 328,657, Oct. 25, 1994, which is a continuation-in-part of Ser. No. 210,668, Mar. 18, 1994.

[51] Int. Cl.⁶ ............................. F24B 4/00; C06D 5/00
[52] U.S. Cl. ........................ 86/20.1; 102/288; 102/290
[58] Field of Search ........................ 86/20.1; 102/288, 102/289, 290, 530; 280/741, 742

[56] References Cited

U.S. PATENT DOCUMENTS

| | | | |
|---|---|---|---|
| 3,117,424 | 1/1964 | Hebenstreit | 62/48 |
| 3,163,014 | 12/1964 | Wismar | 62/48 |
| 3,636,881 | 1/1972 | Godfrey | 102/103 |
| 3,655,217 | 4/1972 | Johnson | 280/150 |
| 3,690,695 | 9/1972 | Jones, Sr. | 280/150 AB |
| 3,721,456 | 3/1973 | McDonald | 280/150 |
| 3,755,311 | 8/1973 | Zimmer-Galler | 149/60 X |
| 3,756,621 | 9/1973 | Lewis et al. | 280/150 AB |
| 3,774,807 | 11/1973 | Keathley et al. | 222/3 |
| 3,788,667 | 1/1974 | Vancil | 280/150 AB |
| 3,822,895 | 7/1974 | Ochiai | 280/150 |
| 3,822,985 | 7/1974 | Ochiai | 280/150 AB |
| 3,901,530 | 8/1975 | Radke | 280/150 AB |
| 3,948,540 | 4/1976 | Meacham | 280/150 AB |
| 3,960,390 | 6/1976 | Goetz | 280/731 |
| 3,966,225 | 6/1976 | Marlow | 280/737 |
| 3,966,226 | 6/1976 | Roth | 280/737 |
| 4,002,514 | 1/1977 | Plower et al. | 147/36 X |
| 4,050,483 | 9/1977 | Bishop | 141/4 |
| 4,115,999 | 9/1978 | Diebold | 60/219 |
| 4,131,300 | 12/1978 | Radke et al. | 280/737 |
| 4,408,534 | 10/1983 | Araki et al. | 102/288 |
| 4,533,416 | 8/1985 | Poole | 149/35 |
| 4,798,142 | 1/1989 | Canterberry et al. | 102/290 |
| 4,938,813 | 7/1990 | Eisele et al. | 149/19.2 |
| 4,948,439 | 8/1990 | Poole et al. | 149/46 |
| 5,016,914 | 5/1991 | Faigle et al. | 280/741 |
| 5,022,674 | 6/1991 | Frantom et al. | 280/741 |
| 5,031,932 | 7/1991 | Frantom et al. | 280/741 |
| 5,033,772 | 7/1991 | Frantom et al. | 280/737 |
| 5,060,974 | 10/1991 | Hamilton et al. | 280/736 |
| 5,062,365 | 11/1991 | Canterberry | 102/290 X |
| 5,125,684 | 6/1992 | Cartwright | 280/736 |
| 5,131,680 | 7/1992 | Coultas et al. | 280/737 |
| 5,160,163 | 11/1992 | Castagner et al. | 280/740 |
| 5,184,846 | 2/1993 | Goetz | 280/736 |
| 5,199,740 | 4/1993 | Franton et al. | 280/736 |
| 5,230,531 | 7/1993 | Hamilton et al. | 280/737 |
| 5,263,740 | 11/1993 | Frey et al. | 280/737 |
| 5,316,600 | 5/1994 | Chan et al. | 149/19.4 |
| 5,346,252 | 9/1994 | Levosinski | 280/740 |
| 5,348,344 | 9/1994 | Blumenthal et al. | 280/737 |
| 5,351,989 | 10/1994 | Popek et al. | 280/737 |
| 5,360,232 | 11/1994 | Lowe et al. | 280/741 |
| 5,386,775 | 2/1995 | Poole et al. | 102/289 |
| 5,411,290 | 5/1995 | Chan et al. | 280/737 |
| 5,423,570 | 6/1995 | Kort et al. | 280/736 |
| 5,429,691 | 7/1995 | Hinshaw et al. | 149/45 |
| 5,439,537 | 8/1995 | Hinshaw et al. | 149/22 |
| 5,441,302 | 8/1995 | Johnson et al. | 280/736 |
| 5,468,015 | 11/1995 | Goetz | 280/737 |
| 5,507,891 | 4/1996 | Ziegler | 149/47 |

FOREIGN PATENT DOCUMENTS 0 520 104 A1   6/1991   European Pat. Off. .
0 592 119 A2   4/1994   European Pat. Off. .

*Primary Examiner*—Peter A. Nelson
*Attorney, Agent, or Firm*—Sheridan Ross, P.C.

[57] ABSTRACT

A hybrid inflator for an automotive inflatable safety system is disclosed. In one embodiment, a mixture of an inert gas (e.g., argon) and oxygen are contained within the inflator housing and a hybrid propellant (i.e., ballistic properties similar to double-base and long-term stability similar to LOVA) is included in the gas generator.

6 Claims, 2 Drawing Sheets

5,675,102

1

METHOD OF ASSEMBLING A HYBRID INFLATOR AND RELATED PROPELLANTS

RELATED APPLICATIONS

This is a divisional of application Ser. No. 08/328,657, filed Oct. 25, 1994, which is a continuation-in-part of U.S. patent application Ser. No. 08/210,668, entitled "Hybrid Inflator", and filed Mar. 18, 1994.

FIELD OF THE INVENTION

The present invention generally relates to the field of automotive inflatable safety systems and, more particularly, to hybrid inflators which utilize both a stored, pressurized gas and a gas and/or heat generating propellant.

BACKGROUND OF THE INVENTION

The evolution of inflators for automotive inflatable safety systems has resulted in the development of pressurized gas only inflators, propellant only inflators, and hybrid inflators. Hybrid inflators utilize a combination of a stored, pressurized gas and gas and/or heat generating propellant to expand the air/safety bag. There are of course many design considerations for each of these types of inflators. In all three systems, two primary design considerations are that the air/safety bag must be expanded a predetermined amount in a predetermined amount of time in order to be operationally effective. Moreover, since the gas within the expanded air/safety bag eventually permeates through the air/safety bag and is discharged to atmosphere, the effect of the gases upon occupants of the automobile is important.

With further regard to the effect of the gases upon the occupants, for instance it is desirable to have the gases within the air/safety bag be below a certain toxicity level. U.S. Pat. Nos. 3,690,695; 3,788,667; and 3,966,226 generally address this issue. Moreover, the appearance of the gases is important. As an example, one problem with current state-of-the-art hybrid inflators is that they produce, in the gas output stream, copious quantities of metal salt fumes (e.g., potassium chloride). This salt is present because an oxygen source has been added to the propellant formulation to minimize carbon monoxide production by oxidizing all carbon in the propellant to carbon dioxide. This salt fume is highly objectional in a crash situation because it has both physiological and psychological effects, imposed at a time of great physical and psychological stress. The salt fume in the post-crash automobile cabin drastically reduces visibility for the crash victims, and creates anxiety over the possibility of fire. Current hybrid inflators use propellants which typically contain more than 70% potassium perchlorate, which yields about 54% of the propellant weight as potassium chloride fume.

Since the weight of the automobile is an important design consideration in many instances today, so too then is the weight of the inflator. Moreover, due to the limited space available in many automotive designs, the size of the inflator is also an important design consideration. These types of factors have effectively rendered pressurized gas only inflators obsolete. Moreover, in propellant only and hybrid inflators, these types of considerations have resulted in many changes to the structure of the inflator and the materials selected for use in this structure. However, little consideration has been given to the propellant to achieve a certain weight reduction.

Although the performance of a given inflator will of course influence the manufacturer's/supplier's position in the marketplace, system performance alone is no longer dispositive. That is, since inflatable safety systems are now being included in a large number of automobiles which will likely increase the number of manufacturers/suppliers of inflators, minimizing the cost of the inflator is becoming increasingly important to obtaining a competitive advantage. Consequently, it would be desirable to not only provide an inflator with competitive performance characteristics, but which is also cost competitive.

SUMMARY OF THE INVENTION

The present invention generally relates to a hybrid inflator for an automotive inflatable safety system. That is, the invention relates to an inflator which utilizes both a stored, pressurized gas and a gas and/or heat generating propellant to expand the air/safety bag. More specifically, the various aspects of the present invention may be embodied in a hybrid inflator which uses a propellant which produces relatively large amounts of carbon monoxide and hydrogen. This would normally be unacceptable in an inflator for an automotive inflatable safety system. However, a sufficiently acceptable amount of these combustion products are converted to harmless carbon dioxide and water vapor by oxygen which is used as at least part of the stored, pressurized gas of the hybrid inflator. This stored oxygen eliminates the need for an oxygen source (e.g., potassium perchlorate) in the propellant formulation itself, and thereby eliminates the largest source of objectionable particulate fume production in the inflator. The reaction of carbon monoxide and hydrogen produced by the propellant with the oxygen stored in the inflator as a gas also greatly enhances the heating value of the propellant, thereby minimizing the amount of propellant required.

One aspect of the present invention is directed toward a hybrid inflator which utilizes a secondary explosive (e.g., nitramines such as RDX (hexahydrotrinitrotriazine) and HMX (cyclotetramethylenetetranitramine), PETN (pentaerythritol tetranitrate), TAGN (triaminoguanidine nitrate) in the propellant formulation (which may also include appropriate inert or energetic binders, inert or energetic plasticizers, and/or stabilizers for providing an appropriate burn rate, manufacturability, long-term thermal stability (aging properties), and mechanical properties). Since these types of propellants generate relatively significant quantities of carbon monoxide and hydrogen, it is desirable to utilize two types of stored gases within the inflator housing. For instance, one of the types of gases may be an inert gas(es) such as argon and may comprise a majority of the stored gas, while the other type of gas may be oxygen. Argon has advantages such as that it is relatively inexpensive, inert, has a relatively large molecule and thus is relatively easy to store at a high pressure (e.g., 3,000 psi) for an extended period of time, and has a low heat capacity. Oxygen is advantageous in that it will exothermically react with the propellant gases and reduce toxicity. Moreover, this reaction generates heat which further contributes to the expansion of the argon by the propellant gases, thereby allowing use of reduced amounts of propellant. Moreover and as noted, the reaction reduces the toxicity of the propellant gases to acceptable levels by driving the reaction equilibrium to $CO_2$ and $H_2O$.

Another aspect of the present invention relates to specific propellant formulations which include a secondary explosive and which may be used in hybrid inflators. Initially, these propellant formulations exhibit ballistic properties generally similar to that of double-base propellants and long-term thermal stability properties generally similar to that of LOVA propellants. Consequently, these propellant formulations are hereinafter referred to as "hybrid propellants".

The hybrid propellant formulations of the above-noted aspect of the present invention include a binder system (preferably energetic) which may include a binder, plasticizer, and/or stabilizer (e.g., one or more compounds which are useful to modify the physical, chemical, and/or ballistic properties) in combination with a secondary explosive, and further have a burn rate ranging from about 0.1 inches per second (0.25 cm/sec) to about 1 inch per second (2.5 cm/sec) at about 4,000 psi (27.6 MPa), a combustion temperature ranging from about 2,000° K. to about 3,800° K., and exhibit acceptable long-term thermal stability (e.g., one industry test is that the inflator will perform acceptably after exposure to 100° C. for a period of 400 hours).

The binder system included with the secondary explosive in the noted hybrid propellant formulation as noted may include a binder, preferably one which is easily combustible at the above-noted combustion temperatures and pressures (e.g., cellulose acetate, GAP (a glycidyl azide polymer which burns significantly more vigorously than cellulose acetate). Moreover, the binder system as noted may also include a plasticizer, preferably one which is "energetic" versus inert (e.g., nitrate ester plasticizers such as TMETN (trimethylolethane trinitrate) or TEGDN (triethyleneglycol dinitrate), or azide substituted polymers such as a GAP plasticizer (e.g., a monomer of the noted glycidyl azide polymer)). Furthermore, and as noted, for certain plasticizers it may be further desirable to also utilize a "stabilizer" in the hybrid propellant formulation, namely a material which will "retard" thermal decomposition of the binder and/or plasticizer to a degree up to a certain temperature such that the potential for autoignition at or below this temperature is reduced. That is, stabilizers may be used for achieving acceptable long-term thermal stability for hybrid propellant formulations which use a binder and/or plasticizer which, if not stabilized, would render the long-term thermal stability of the hybrid propellant formulation generally unacceptable.

One specific hybrid propellant formulation based upon the secondary explosive and binder system which may be used in a hybrid inflator includes RDX (hexahydrotrinitrotriazine), cellulose acetate (binder), TMETN (trimethylolethane trinitrate) (an energetic nitrate ester plasticizer) and ethyl centralite (stabilizer). Another hybrid propellant formulation based upon the secondary explosive and binder system which may be used in a hybrid inflator includes RDX (hexahydrotrinitrotriazine), GAP (glycidyl azide polymer) (binder), and an appropriate plasticizer (e.g., a GAP monomer, TMETN). In order to reduce the cost of this formulation, cellulose acetate may be used in combination with the GAP as the binder, and ATEC (acetyl triethyl citrate and a plasticizer) may also be used in combination with the GAP monomer plasticizer.

Another aspect of the present invention relates to a hybrid inflator having a modified gas generator structure, for instance to accommodate for use of the above-described propellants. Generally, the inflator includes an inflator housing with a pressurized medium therein. The gas generator is interconnected with the inflator housing and includes a gas generator housing which contains a propellant. The sidewall of the gas generator housing has at least one and preferably a plurality of gas generator outlets, and at least one gas generator inlet is positioned on an end of the gas generator housing. When the inflator is activated such that the pressurized medium begins flowing by the sidewall of the gas generator housing and out of the inflator, a pressure differential develops such that pressurized medium is drawn into the gas generator housing through the gas generator inlet. Consequently, it will be appreciated that this is advantageous for mixing the above-described pressurized medium, and particularly the oxygen portion thereof, with the combustion products of the above-noted types of propellant. Nonetheless, gases are discharged through the gas generator outlet(s) on the sidewall of the gas generator housing to augment the discharge from the inflator.

DETAILED DESCRIPTION

The present invention will be described with regard to the accompanying drawings which assist in illustrating various features of the invention. In this regard, the present invention generally relates to hybrid inflators for automotive inflatable safety systems. That is, the invention relates to an inflator which utilizes both a stored, pressurized gas and a gas and/or heat generating propellant. Various types of hybrid inflators are disclosed in U.S. Pat. No. 5,230,531 to Hamilton et al. which is assigned to the assignee of this application, and the entire disclosure of this patent is hereby incorporated by reference in its entirety herein.

Figure 1:
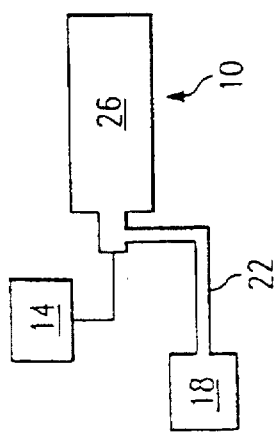
FIG. 1 is a schematic representation of an automotive inflatable safety system.

One embodiment of an automotive inflatable safety system is generally illustrated in FIG. 1. The primary components of the inflatable safety system 10 include a detector 14, an inflator 26, and an air/safety bag 18. When the detector 14 senses a condition requiring expansion of the air/safety bag 18 (e.g., a predetermined deceleration), a signal is sent to the inflator 26 to release gases or other suitable fluids from the inflator 26 to the air/safety bag 18 via the conduit 22.

Figure 2:
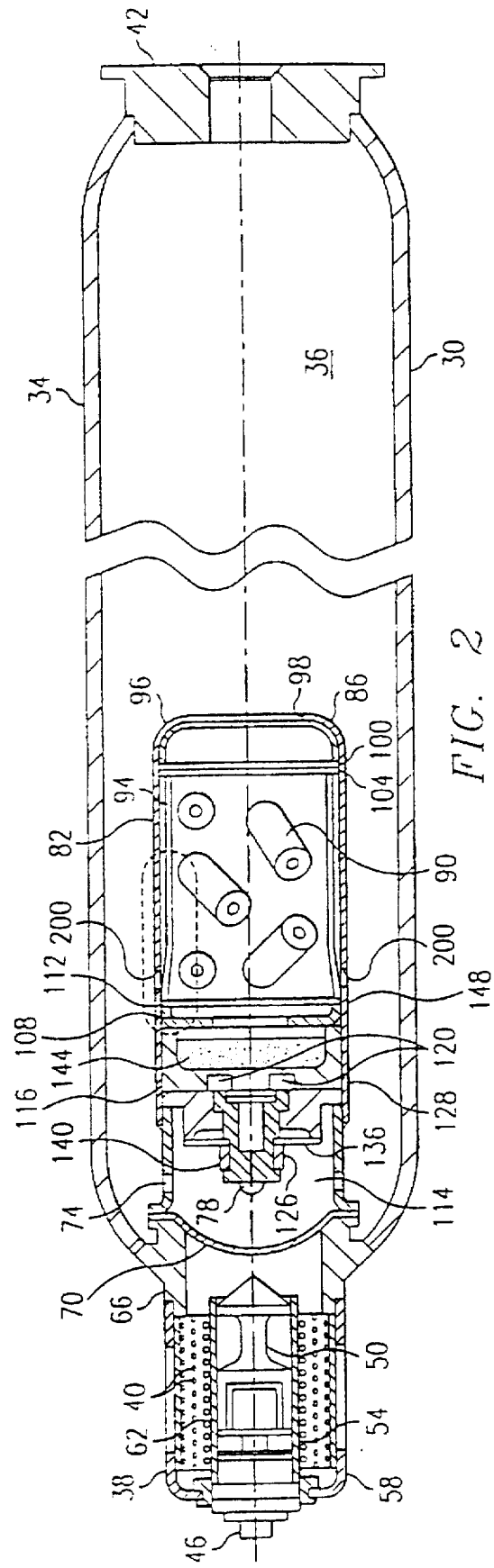
FIGS. 2 and 2A are a longitudinal cross-sectional view and a partial sectional view of a hybrid inflator which may incorporate one or more principles of the present invention.
Figure 2A:
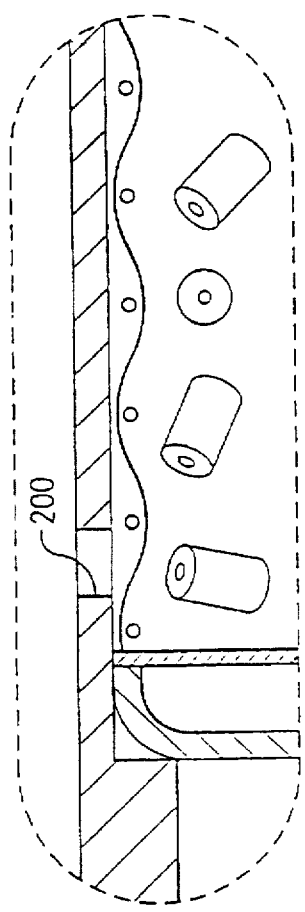

The inflator 30 illustrated in FIGS. 2 is a hybrid inflator and may be used in the inflatable safety system 10 of FIG. 1 in place of the inflator 26. Consequently, the inflator 30 includes a bottle or inflator housing 34 having a pressurized medium 36 that is provided to the air/safety bag 18 (FIG. 1) at the appropriate time, as well as a gas generator 82 that provides propellant gases to augment the flow to the air/safety bag 18 (e.g., by providing heat to expand the pressurized medium 36 and/or generating additional gases). As will be discussed in more detail below, a gun-type propellant (e.g., a high temperature, fuel-rich propellant) may be used for the formulation of the propellant grains 90 positioned in the gas generator 82 and a mixture of at least one inert gas (e.g., argon) and oxygen may be used for the pressurized medium 36.

The inflator housing 34 and gas generator 82 are interconnected, with the gas generator 82 being positioned inside the inflator housing 34 to reduce the space required for the inflator 30. More specifically, a hollow diffuser 38 is welded to one end of a hollow boss 66 (e.g., having a diameter of about 1.25"). The diffuser 38 has a plurality of rows of discharge holes 40 (e.g., 80 discharge holes 40 each having a diameter of about 0.100") therethrough which provides a "non-thrusting output" from the inflator 30 and a screen 58 is positioned adjacent the discharge holes 40. A closure disk 70 is appropriately positioned within the boss 66 and is welded thereto in order to initially retain the pressurized medium 36 within the inflator housing 34. When release is desired, a projectile 50 having a substantially conically-shaped head is propelled through the closure disk 70. More particularly, the projectile 50 is positioned on the convex side of the closure disk 70 within a barrel 54 and is propelled by the activation of an initiator 46 when an appropriate signal is received from the detector 14 of the inflatable safety system 10 (FIG. 1). A ring 62 is provided to initially retain the projectile 50 in position prior to firing.

An orifice sleeve 74 is welded to the closure disk 70 and/or the end of the boss 66. The orifice sleeve 74 is hollow and includes a plurality of orifice ports 78 (e.g., four ports 78 each having a diameter of about 0.201") to fluidly interconnect the interior of the inflator housing 34 and the interior of the boss 66 and diffuser 38 when the closure disk 70 is ruptured by the projectile 50. Moreover, the gas generator 82, more specifically the gas generator housing 86, is welded to the orifice sleeve 74 to complete the interconnection of the inflator housing 34 and gas generator 82.

The gas generator housing 86 contains a plurality of propellant grains 90 which when ignited provide heated propellant combustion product gases for augmenting the flow to the air/safety bag 18 (FIG. 1). The propellant grains 90 are retained within the gas generator housing 86 by a propellant sleeve 94 which is separated from the gas generator inlet nozzle 98 on the end 96 of the gas generator housing 86 by a screen 104 and baffle 100. As will be discussed below, the propellant grains 90 may be formulated from a gun-type propellant. Nonetheless, the grains 90 are substantially cylindrically-shaped With a single hole extending through the central portion thereof. Other propellant grain configurations may be appropriate and will depend at least in part on the particular propellant formulation being used.

A single (or multiple) gas generator inlet nozzle 98 (e.g., a single nozzle 98 having a diameter of about 0.516") is positioned on the end 96 of the gas generator housing 86 and is generally directed away from the closure disk 70. The gas generator housing 86 also includes a plurality of circumferentially spaced outlet or discharge nozzles 200 (e.g., one "row" of four nozzles 200 each having a diameter of about 0.221") on the sidewall of the housing 86. It may be desirable to vary the axial location of these nozzles 200 (they may be generally at the mid-portion of the housing 86), although operations may be enhanced by a location more proximate the outlet. Moreover, it may be desirable to vary the number of nozzles 200. With this configuration of having discharge nozzles 200 on the sidewall of the gas generator housing 86 and an inlet nozzle 98 on the end 96 of the housing 86, during combustion of the propellant grains 90 the pressurized medium 36 is drawn into the gas generator housing 86 through the inlet nozzle 98 and the mixed gases from within the gas generator housing 86 flow out of the housing 86 through the nozzles 200. Specifically, the flow of pressurized medium 36 by the sidewall of the gas generator housing 86 produces a pressure differential which draws pressurized medium 36 into the gas generator housing 86 through the inlet nozzle 98. This significantly improves upon the performance of the inflator 30 at least when certain types of propellant gases are produced as will be discussed in more detail below.

The gas generator 82 includes an ignition assembly 114 for igniting the propellant grains 90 at the appropriate time. The ignition assembly 114 is at least partially positioned within the gas generator housing 86 between the projectile 50 and propellant grains 90 and generally includes an actuation piston 124, and at least one percussion primer 120 and an ignition/booster material 144 which serve as an activator. More particularly, an actuation guide 140 engages an end portion of the orifice sleeve 74 and the interior wall of the gas generator housing 86, the actuation guide 140 thereby functioning at least in part to contain at least a portion of and guide the actuation piston 124 positioned therein. A primer holder 116 engages an end of the actuation guide 140 and houses a plurality of conventional percussion primers 120 which are positioned substantially adjacent to the ignition/booster material 144. The ignition/booster material 144 is typically retained adjacent the primers 120 by a charge cup 148. An example of an appropriate ignition/booster material 144 is an RDX aluminum booster material having a composition of 89% RDX, 11% aluminum powder, with 0.5% hydroxypropyl-cellulose added. A retainer 108 and baffle 112 are positioned between the primer holder 116 and propellant sleeve 94. In the event that the gas generator housing 86 is attached to the orifice sleeve 74 by crimping instead of welding, the gas generator housing 86 may have a tendency to lengthen during operation. Consequently, in order to maintain a firm interaction of the foregoing components, a wave spring washer (not shown) may be positioned, for instance, between the retainer 108 and the baffle 112.

The actuation piston 124 is slidably positioned within the actuation guide 140 and includes a continuous rim projecting member 128 which is substantially aligned with the primers 120. As can be appreciated, a plurality of projecting members (not shown), could replace the substantially continuous rim projecting member 128. A belleville washer 136 is positioned between and engages a portion of both the actuation guide 140 and actuation piston 124 (via a spacer 126) to initially maintain the position of the actuation piston 124 away from the primers 120. Consequently, the potential for inadvertent engagement of the actuation piston 124 with the primers 120, which could activate the gas generator 82, is reduced. However, after the projectile 50 passes through the closure disk 70, the energy transferred to the actuation piston 124 by the projectile 50 is sufficient to overcome the belleville washer 136 such that the projecting rim 128 is able to engage the primers 120 with sufficient force to ignite at least one of such primers 120. This in turn causes ignition of the ignition/booster material 144, and thus ignition of the propellant grains 90 results.

During operation of the gas generator 82, the primers 120 may erode and thereby allow propellant gases generated by combustion of the propellant grains 90 to flow through the primers 120. Any leakage of propellant gases in this manner may adversely affect the consistency of performance of the inflator 30. These gases, however, desirably act upon the actuation piston 124 to move the piston 124 into sealing engagement with the actuation guide 140. This provides a seal for the gas generator housing 90 which substantially limits any leakage of gases therethrough. Therefore, the propellant gases desirably flow through the gas generator nozzle 98.

Summarizing the operation of the inflator 30, the detector 14 (FIG. 1) sends a signal to the initiator 46 to propel the projectile 50. The projectile 50 initially passes through the closure disk 70 to open the passageway between the inflator housing 34 and air/safety bag 18 (FIG. 1). The projectile 50 continues to advance until it impacts the actuation piston 124 which causes the projecting rim 128 attached thereto to strike at least one of the aligned primers 120. As a result, the ignition/booster charge 144 ignites, which in turn ignites the propellant grain 90. During combustion of the grains 90 within the housing 86, the pressurized medium 36 from the inflator housing 34 is drawn into the gas generator housing 86 through the inlet nozzle 98 positioned on the end 96 of the housing 86. This results from the flow of the pressurized medium 36 by the sidewall of the gas generator housing 86 which produces a pressure differential. This "drawing in" of the pressurized medium 36 promotes mixing of the propellant gases and the pressurized medium 36 within the housing 86, and as will be discussed in more detail below this is particularly desirable when oxygen is included in the pressurized medium 36 to react with propellant gases having a large content of carbon monoxide and hydrogen. Nonetheless, gases are discharged from gas generator housing 86 through the discharge nozzles 200 on the sidewall of the housing 86. As such, the flow to the air/safety bag 18 is desirably augmented (FIG. 1) by mixing of the pressurized medium 36 with the combustion products from the gas generator housing 86.

As noted above, the hybrid inflator 30 may utilize a gun-type propellant, as the formulation for the propellant grains 90, and a mixture of at least one inert gas and oxygen for the pressurized medium 36. Gun-type propellants, as used herein, are high temperature, fuel-rich propellants such as single, double, or triple-base propellants, and nitramine propellants such as LOVA or HELOVA propellants. More specifically, traditional gun-type propellants are those having a combustion temperature ranging from about 2,500° K. to about 3,800° K., and typically greater than about 3,000° K., and are fuel-rich in that without excess oxygen, these propellants generate significant amounts of CO and $H_2$. The excess of fuel from these propellants typically requires additional oxygen between 5 and 25 mole percent, or sometimes even between 15 and 40 mole percent, of the stored gas to drive the reaction equilibrium to $CO_2$ and $H_2O$.

Specific "traditional" gun-type propellants which may be used for the propellant grains 90 of the hybrid inflator 30 include HPC-96, a double base, smokeless propellant having a composition, on a weight percentage basis, of about 76.6% nitrocellulose of which about 13.25% is nitrogen; about 20.0% nitroglycerin; about 0.6% ethyl centralite; about 1.5% barium nitrate; about 0.9% potassium nitrate; and about 0.4% graphite. HPC-96 is available from Hercules, Inc. in Wilmington, Del. Since this particular double-base propellant includes nitrocellulose as a major ingredient, it cannot meet current auto industry standards for long-term thermal stability, although it does produce desirable ballistic operation.

LOVA propellants (low vulnerability ammunition) and HELOVA propellants (high energy, low vulnerability ammunition) are another "traditional" gun-type propellant which may also be used for the propellant grains 90, such as a M39 LOVA propellant having a composition, on a weight percentage basis, of about 76.0% RDX (hexahydrotrinitrotriazine); about 12.0% cellulose acetate butyrate; about 4.0% nitrocellulose (12.6% nitrogen); about 7.60% acetyl triethyl citrate; and about 0.4% ethyl centralite. The M39 LOVA propellant is available from the Naval Surface Warfare Center in Indianhead, Md. and Bofors in Europe (Sweden) and generates, without excess oxygen, about 32 mole percent CO and 30 mole percent $H_2$. The LOVA and HELOVA propellants are preferred over existing double-base propellants because they pass current U.S. automotive industry thermal stability standards, whereas double-base propellants do not. However, relatively high operating pressures are required for stable combustion of LOVA and HELOVA propellants. Notwithstanding the characteristics of the HPC-96 and LOVA propellants, they do serve to illustrate at least some of the principles/features of the present invention.

Due to the performance characteristics of gun-type, propellants when used as the formulation for the propellant grains 90, together with the use of oxygen as a portion of the pressurized medium 36, it is possible to reduce the amount of propellant required for the gas generator 82 compared to current designs using, for example, 20–30 grams of FN 1061-10 available from the assignee of this patent application (FN 1061-10 has a composition, on a weight percentage basis, of about 7.93% polyvinyl chloride, 7.17% dioctyl adipate, 0.05% carbon black, 0.35% stabilizer, 8.5% sodium oxalate, 75% potassium perchlorate, and about 1% lecithin). For instance, generally for gun-type propellants which may be used in the formulation of the propellant grains 90 the total grain weight may range (in passenger side applications) from about 10 grams to about 12 grams, and is preferably less than about 15 grams. In this case, it is preferable to utilize between about 150 grams and about 190 grams of pressurized medium 36 with the oxygen being between about 10% to about 30% of this medium 26 on a molar basis. More specifically, when about 169 grams of the pressurized medium 36 is utilized, with about 15% of this on a mole percentage basis being oxygen, the total weight of the propellant grains 90 may be about 10.4 grams. For driver side applications, the desired/required amount of propellant grains 90 may be about 5 grams and for a side inflator application approximately 1.5 grams.

The above-identified reduction in the amount of gun-type propellant in comparison to the above-identified FN 1061-10 propellant composition may be also expressed as a ratio of the weight of the pressurized medium 36 to the total weight of propellant grains 90. With regard to the FN 1061-10 propellant, the assignee of this application presently uses a ratio of about 7.04 for the weight of argon (i.e., the stored gas and corresponding with the pressurized medium 36 associated with the present invention) to the weight of FN 1061-10 propellant. With regard to the use of a gun-type propellant, to achieve an inflator with the same output, weight, and size as an inflator with FN 1061-10, the ratio of the weight of the pressurized medium 36 to the total weight of the propellant grains 90 ranges from about 10 to about 20, and more preferably from about 14 to about 18, and is most preferably greater than about 15. As can be appreciated, these ratios may be further increased by use of hotter propellants, which would require even less propellant. In this regard, because the output gases of gun-type propellants are essentially free of hot particulate matter, the inflator can produce output gases at a higher temperature than can a particulate-laden inflator such as current state-of-the-art hybrids. This increase in temperature will allow the inflator to be smaller and lighter still, since the hotter gas is relatively more expansive. In addition to the foregoing, generally size and weight reductions of the inflator structure may be achieved when using gun-type propellants. For instance, when using even a ratio of 7.04 for gun-type propellants in an inflator, the same output may be achieved as in the case of using the same ratio of FN 1061-10, but the inflator with the gun-type propellant may be about 50% lighter and smaller than the inflator using FN 1061-10. The ratio of 7.04 can be used equally well for driver side applications and side inflators in the noted manner.

The above-identified reduction in the amount of gun-type propellant in comparison to the above-identified FN 1061-10 propellant composition may also be expressed as a ratio of the gram moles of the total gas output (i.e., the combination of the propellant gases and the pressurized medium 36) to the total weight of the propellant grains 90. With regard to the FN 1061-10 propellant, the assignee of the application presently uses a ratio of about 0.192 gram moles/gram of propellant for the moles of the output gas to the weight of the propellant. In comparison and generally in the case of a gun-type propellant for an inflator of the same output, weight, and size, the ratio of the moles of the output gas to the total weight of the propellant grains 90 ranges from about 0.35 gram moles per gram of propellant to about 0.6 gram moles per gram of propellant, more preferably from about 0.4 gram moles per gram of propellant to about 0.5 gram moles per gram of propellant, and is most preferably about 0.5 gram moles per gram of propellant. As noted above, for hybrid inflators using gun-type propellants and even using a ratio of 0.192 gram moles/gram of propellant, the inflator output is the same as a hybrid inflator using FN 1061-10, but the weight and size of the gun-type propellant hybrid inflator is reduced about 50%.

The use of multiple gases for the pressurized medium 36 allows for the use of at least a gun-type propellant formulation for the propellant grains 90. Generally, the pressurized medium 36 is composed of at least one inert gas and oxygen. Appropriate inert gases include argon, nitrogen, helium, and neon, with argon being preferred. The oxygen portion of the pressurized medium is multi-functional. Initially, the reaction of the oxygen with the gaseous combustion products of the gun-type propellant of the propellant grains 90 provides a source of heat which contributes to the expansion of the inert gas. This allows at least in part for a reduction in the amount of propellant which is required for the gas generator 82. Moreover, the reaction of the oxygen with the propellant combustion products also reduces any existing toxicity levels of the propellant gases to acceptable levels. For instance, the oxygen will convert preferably a substantial portion of existing carbon monoxide to carbon dioxide (e.g., convert at least about 85% of CO to $CO_2$) and existing hydrogen to water vapor (e.g., convert at least about 80% of the $H_2$ to $H_2O$), and a substantial portion of the unburned hydrocarbons will be similarly eliminated (e.g., eliminate at least about 75% of the hydrocarbons). As such, the performance of the gas generator 82 as discussed above is significantly improved. That is, the medium 36 and including the oxygen is drawn into the gas generator housing 86 through the inlet nozzle 98 on the end 96 of the housing 86 by the pressure differential produced by the flow of the pressurized medium 36 by the sidewall of the gas generator housing 86 having the discharge nozzles 200 thereon. As a result, there is a mixing of the medium 36 with the CO and hydrogen-rich combustion products of the gas generant which dramatically improves the overall combustion efficiency of the gas generant, the mixing of the combustion products of the gas generant with the oxygen-rich medium 36, and the burning rate of the propellant grains 90. Gases are then drawn out of the discharge nozzles 200 on the sidewall of the housing 86. The above configuration of the gas generator housing 86 thereby greatly improves upon the performance of the inflator 30 (e.g., by promoting the quick and efficient mixing of the oxygen with the propellant gases).

The amount of the at least one inert gas, on a molar basis, is generally between about 70% and about 90% and the amount of oxygen, on a molar basis, is generally between about 10% and about 30%. Generally, it is desirable to use an amount of oxygen in excess of that based upon theoretical conversions. However, it is also generally desirable to not have more than about 20% (molar) oxygen in the output gas (i.e., the combination of the propellant gases and the pressurized medium).

The inflator 30 may be assembled in the following manner. Initially, the gas generator 82 is assembled, such as by: 1) inserting the baffle 100 and screen 104 in the gas generator housing 86 adjacent the discharge end 96; 2) inserting the propellant sleeve 94 in the gas generator housing 86; 3) positioning the propellant grains 90 within the propellant sleeve 94; 4) inserting the baffle 112 and retainer 108 in the gas generator housing 86 adjacent the end of the propellant sleeve 94 opposite the discharge end 96 of the generator; 5) inserting the primer holder 116, with the ignition/booster material 144 and charge cup 148, in the gas generator housing 86; and 6) inserting the actuation guide 140, belleville washer 136, and actuation piston 124 into the gas generator housing 86. Thereafter, the various parts are interconnected, such as by welding the gas generator housing 86 to the orifice sleeve 74, by welding the diffuser 38 to the boss 66 after positioning the projectile 50 and initiator 46 in the diffuser 38, welding the closure disk 70 between the boss 66 and orifice sleeve 74, and welding the boss 66 to the inflator housing 34. With the above structure intact, the pressurized medium 36 may be introduced into the inflator housing 34. In this regard and in the case of multiple gases, the argon and oxygen may be separately introduced (e.g., first introduce the argon and/or other inert gases and then the oxygen or vice versa) into the inflator housing 34 through the end plug 42 which is welded to the end of the inflator housing 34, or introduced in the pre-mixed state.

The following examples further assist in the description of various features associated with the use of gun-type propellants in hybrid inflators.

EXAMPLE 1

The above-noted HPC-96 propellant was used to form the propellant grains 90 having a total weight of 18 grams. Each propellant grain 90 had the configuration generally illustrated in FIG. 2, and had a length or thickness of about 0.52 inches, an outer diameter of about 0.29 inches, and a web thickness of about 0.105 inches (one-half of the difference between the inner and outer diameters of the propellant grain 90). Moreover, the HPC-96 propellant had the following properties when ignited in the presence of air: an impetus of 363,493 ft-lbs/lb; a heat of explosion of 1,062 calories/gram;. a $T_v$ of 3490° K.; a molecular weight of the gases of 26.7 grams/mole; a specific heat ratio of 1.2196; and a solid density of 1.65 grams/cubic centimeter. The gas composition, based upon theoretical calculations of normal compositions and assuming a combustion at gun pressures expanded to atmospheric pressure, on a molar percentage basis, was: about 26.5% carbon monoxide; about 19.1% water; about 26.2% carbon dioxide; about 13.7% nitrogen; about 14.2% hydrogen; and about 0.3% other gases.

When the propellant grains 90 of HPC-96 were subjected to the industry standard Taliani thermal stability test at a temperature of 120° C., the grains 90 began to discolor within about 40 minutes and ignited within about 5 hours. This reduces the desirability of using the HPC-96 propellant for the propellant grains 90 since one current industry standard requires that a propellant for an inflatable safety system does not degrade substantially when exposed to a temperature of 107° C. for a period of 400 hours, and that the propellant thereafter ignite when exposed to its autoignition temperature. However, the HPC-96 propellant does illustrate certain principles of the present invention and is thus included herein.

With regard to HPC-96 propellant grains 90, about 169 grams of the pressurized medium 36 was provided to the inflator housing 34 and consisted, on a molar percentage basis, of about 5% oxygen and about 95% argon. The inflator 30 had four orifice ports 78 on the orifice sleeve 74 with each having a diameter of about 0.266", and the gas generator nozzle 98 had a diameter of about 0.469". No discharge nozzles 200 were provided on the sidewall of the gas-generator housing 86. As such, no pressurized medium 36 was drawn into the gas generator 82 during operation and all discharge was through the nozzle 98.

Figure 3:
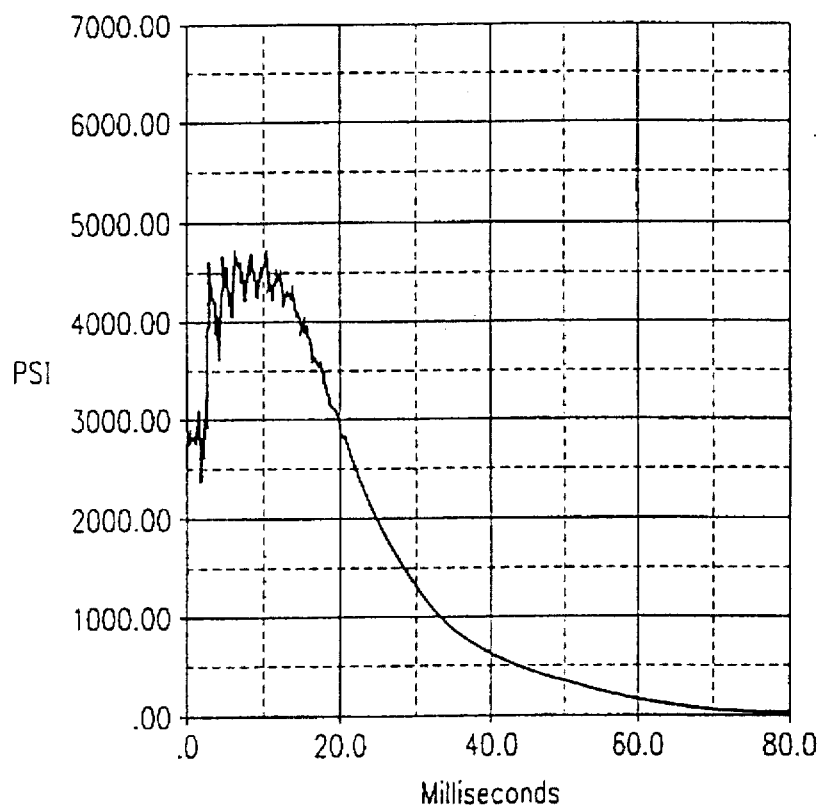
FIG. 3 is an inflator internal pressure versus time performance curve for the propellant composition of Example 2.
Figure 4:
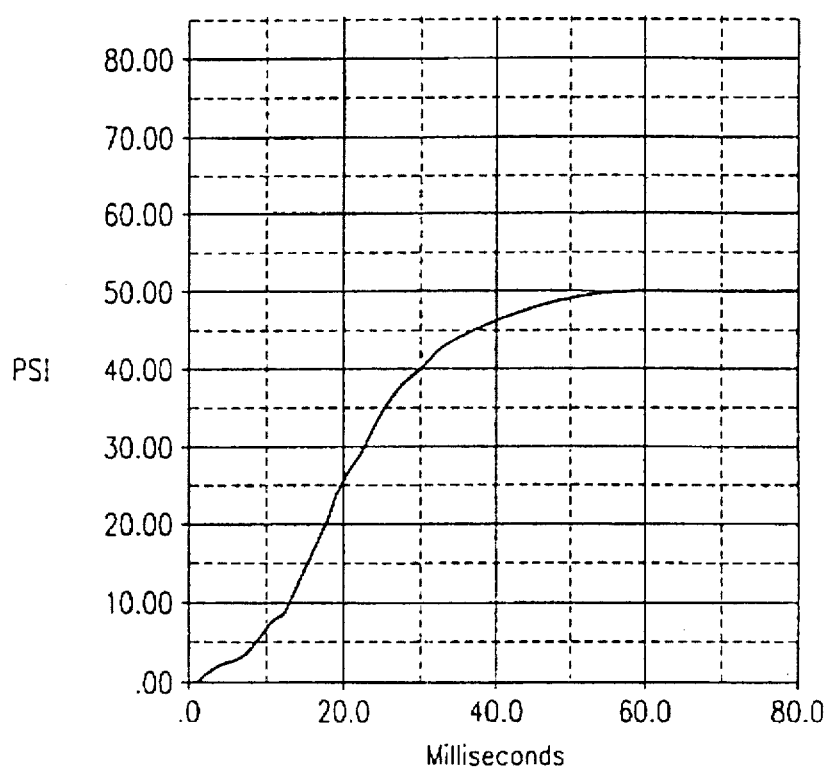
FIG. 4 is a receiving tank pressure versus time performance curve for the propellant composition of Example 2.

The pressure variation within the inflator housing 34 during operation of the inflator 30 was similar to that presented in FIG. 3, and the pressure within a 100 liter tank fluidly interconnected with the inflator 30 was similar to that illustrated in FIG. 4 and is generally representative of the pressure buildup within the air/safety bag 18. The gaseous output from the inflator 30 included, on a weight percentage basis, about 1.2% carbon monoxide, about 1.5% carbon dioxide, greater than about 2% hydrogen, and about 60 ppm of $NO_x$. Consequently, the use of argon and oxygen in the noted proportions significantly reduced the amount of carbon monoxide and hydrogen when compared to the theoretical gaseous output of the HPC-96 propellant noted above. In this example, the radial holes were not used, and only a single gas generator outlet was used.

EXAMPLE 2

The procedure of Example 1 was repeated but 10.4 grams of HPC-96 propellant was used for the grains 90 and about 164.4 grams of a pressurized medium 36 was used with the composition being, on a molar percentage basis, about 15% oxygen and about 85% argon. The performance curves for the inflator 30 when actuated with these propellant grains 90 are illustrated in FIGS. 3 and 4 and the inflator 30 was configured in the manner discussed in Example 1. Moreover, the gaseous output from the inflator 30 included, on a molar percentage basis, about 2.4% carbon dioxide, about 1000 ppm carbon monoxide, about 70 ppm $NO_x$, about 38 ppm $NO_2$, and about 0 ppm of hydrogen. Consequently, with the increase in the amount of oxygen to 15% from the 5% of Example 1, the amount of carbon monoxide was significantly reduced without an appreciable increase in NO and $NO_2$. Moreover, this also allowed for the use of significantly less propellant.

EXAMPLE 3

The procedure of Example 1 was repeated twice using 10.4 grams of HPC 96 and 169.0 grams of pressurized medium 36 composed, on a molar percentage basis, of about 15% oxygen and about 85% argon. The performance curves for the inflator 30 were similar to those presented in FIGS. 3–4 and the inflator 30 was configured in the manner discussed in Example 1. Moreover, the gaseous output from the inflator 30 included about 1000 ppm and 800 ppm carbon monoxide, respectively, about 1.0% and 1.2% carbon dioxide, respectively, about 60 ppm and 50 ppm $NO_x$, respectively, and about 23 ppm and 20 ppm $NO_2$, respectively. Consequently, the increase in the amount of oxygen to 15% and the reduction of the amount of HPC 96 reduced the amount of carbon monoxide without an appreciable effect upon NO and $NO_2$. Moreover, the increased amount of oxygen allowed for the use of less propellant.

As noted above, two existing "traditional" gun-type propellants were initially considered for this application -conventional double-base gun propellants and low vulnerability nitramine (LOVA) gun propellants. With conventional double-base gun propellants, the system performs as expected, but will not pass industry standards for long-term storage (e.g., 400 hours at 107° C.). With LOVA gun propellants, the system performance was determined to be unsatisfactory unless the propellant is burned at a very high pressure (e.g., above 9,000 psi), which adds weight, cost, and complexity to the design. Generally, it is desirable for operating pressures of no more than about 4,000 psi to be utilized for the inflator. Because no existing propellant is satisfactory for this application Under these conditions, a new propellant formulation was developed which constitutes a new class of propellant—a propellant which combines the ballistic properties of double base propellants (ignites and burns well at low pressure) with the storage properties of nitramine LOVA propellants (performs well after storage at 107° C. for 400 hours). This class of propellants as noted is referred to as a hybrid propellant.

Thermally stable gun-type propellants, unlike nitrocellulose-based propellants like HPC-96, when used as the formulation for the propellant grains 90 include a secondary explosive, namely a nitramine (RDX) in the case of the LOVA propellants. Other appropriate secondary explosives which may be used in the formulation of the propellant grains 90 include another nitramine, namely HMX (cyclotetramethylenetetranitramine), as well as PETN (pentaerythritol tetranitrate) and TAGN (triaminoguanidine nitrate). Table 1 below provides certain combustion properties for the RDX, HMX, and PETN secondary explosives.

TABLE 1

| TYPE | FLAME TEMPERATURE (°K.) (at 3,000 psi) | COMBUSTION GASES PRODUCED w/o excess $O_2$ (mole %) |
|---|---|---|
| RDX | 3348 | 33% $N_2$ |
|  |  | 25% CO |
|  |  | 23% $H_2O$ |
|  |  | 9% $H_2$ |
|  |  | 8% $CO_2$ |
|  |  | remainder others |
| HMX | 3340 | 33% $N_2$ |
|  |  | 25% CO |
|  |  | 23% $H_2O$ |
|  |  | 9% $H_2$ |
|  |  | 8% $CO_2$ |
|  |  | remainder others |
| PETN | 3444 | 19.5% CO |
|  |  | 17% $N_2$ |
|  |  | 3% $H_2$ |
|  |  | 30% $H_2O$ |
|  |  | 24% $CO_2$ |

Generally, in order to achieve a desired combination of certain ballistic properties and long-term thermal stability (e.g., to attempt to achieve the ballistic characteristics of a double-base propellant and the long-term aging characteristics or long-term thermal stability of a LOVA propellant), a secondary explosive may be combined with a binder system as the formulation for the propellant grains 90 (as noted above "hybrid propellants"). The phrase "binder system", as used herein, refers to one or more compounds added to the propellant which are useful for modifying the physical, chemical, and/or ballistic properties of the propellant. Useful binder systems include those which incorporate propellant additives selected from the group consisting of binders, plasticizers, stabilizers, opacifiers, and combinations thereof.

Hybrid propellants for the propellant grains 90 in the hybrid inflator 30 exhibit good ballistic properties (i.e. burn rate and combustion temperature at a relatively low operating pressure, and exhibit acceptable long-term stability (e.g., one industry test for assessing long-term thermal stability being a statistically sufficient number of samples withstanding (not igniting) exposure to a temperature of 107° C. for a period of 400 hours). Another test is inflators withstanding, without unacceptable loss of performance, (which is typically established/specified by the customer), exposures to a temperature of 100° C. for 400 hours. More particularly, propellant grains 90 formed from a hybrid propellant burn at a combustion temperature ranging from about 2,000° K. to about 3,800° K., at a rate ranging of about 0.1 inches per second (0.25 cm/sec) to about 1 inch per second (2.5 cm/sec), and at an operating pressure (the pressure within the gas generator housing 84) of about 4,000 psi (27.6 MPa) or less. More preferably, the propellant grains 90 formed from a hybrid propellant burn at a combustion temperature ranging from about 2,000° K. to about 3,800° K., at a rate ranging from about 0.3 inches per second (0.76 cm/sec) to about 0.5 inches per second (1.26 cm/sec), and at an operating pressure of about 4,000 psi (27.6 MPa) or less.

In general, the hybrid propellant formulations comprise from about 50 wt. % to about 90 wt. % of a secondary explosive and from about 10 wt. % to about 50 wt. % of a binder system. More typically, these propellant formulations include from about 60 wt. % to about 80 wt. % of a secondary explosive and from about 20 wt. % to about 40 wt. % of a binder system. Preferably, the propellant formulation includes from about 70 wt. % to about 80 wt. % of a particular secondary explosive and from about 20 wt. % to about 30 wt. % of a binder system. Other additives and unavoidable impurities can also be present in these propellant compositions in minute amounts (i.e., in amounts less than about 5 wt. % of the composition).

Typically, a resinous binder will be part of the binder system for a hybrid propellant formulation for the propellant grains 90. Nearly any type of binder soluble in common solvents (i.e. acetone, lower alcohols, etc.) can be used. However, it is generally desirable that the binder be an active or energetic compound. That is, it is desirable for the binder to be one which is easily combustible at the above-noted desired combustion temperatures and operating pressures. Furthermore, when using a binder in combination with a plasticizer, it is of course desirable that the binder be compatible with the plasticizer. Typical binders suitable for use in the propellant compositions include, but are not limited to, CA (cellulose acetate), CAB (cellulose acetate butyrate, EC (ethyl cellulose), and PVA (polyvinyl acetate). Moreover, GAP (an energetic glycidyl azide polymer) may be utilized as a binder component and such burns substantially more vigorously than CA. As such, it may be desirable to utilize only GAP as the binder with a secondary explosive. However, due to the significant differences in cost currently between GAP and CA, a hybrid propellant formulation may include both GAP and CA binder components.

Plasticizers can also be part of the binder system for the hybrid propellant formulation for the propellant grains 90. As noted, the plasticizer should be compatible with the binder. Moreover, it is generally desirable to use a binder system which is extrudable. Furthermore, at least for certain secondary explosives (e.g., nitramines) it is desirable to use energetic plasticizers, that is plasticizers that are capable of stable combustion within the above-noted operating temperatures and pressures. Useful energetic plasticizers include, but are not limited to, those selected from the group consisting of nitrate ester plasticizers such as TMETN (trimethylolethane trinitrate), BTTN (butanetriol trinitrate), and TEGDN (triethyleneglycol dinitrate) and glycidyl azide plasticizer and other compounds such as NG (nitroglycerin), and BDNPA/F (bis (2,2-dinitropropyl) acetal/formal).

Stabilizers may also be included in the binder system for the hybrid propellant formulation for the propellant grains 90. For instance, certain binders and/or plasticizers such as the above-noted nitrate ester plasticizers will decompose upon exposure to certain temperatures, and may affect ignition of the propellant grains 90 (i.e., upon exposure to certain temperatures the nitrate ester plasticizer will thermally decompose to the degree where ignition occurs). Consequently, stabilizers may be included in the hybrid propellant formulation which will "react" with the thermally decomposing binder and/or plasticizer to maintain stability (e.g., reduce the potential for premature ignition of the propellant) and thereby enhance the long-term stability of the hybrid propellant formulation. For instance, in the case of a nitrate ester plasticizer, useful stabilizers for the propellant formulation include those which are active materials, yet are nitrate acceptors. Suitable stabilizers include, but are not limited to, ethyl centralite (symdiethyldiphenylurea), DPA (diphenylamine), and resorcinol.

One hybrid propellant formulation which has the desired ballistic properties and which has provided sufficient indications of suitable long-term stability include the combination of the nitramine secondary explosive RDX (hexahydrotrinitrotriazine) with a binder system including the binder CA (cellulose acetate), the plasticizer TMETN (trimethylolethane trinitrate), and the stabilizer EC (ethyl centralite). Generally, this hybrid propellant formulation may comprise at least about 70 wt. % RDX, from about 5 wt. % to about 15 wt. % CA, from about 5 wt. % to about 15 wt. % TMETN, and no more than about 2 wt. % EC. These general relative amounts provide the desired ballistic and long-term aging properties for the hybrid propellant. However, it will be appreciated that if propellant grains 90 are to be formed by extrusion from this formulation, refinements of the relative amounts within the noted ranges may be necessary.

Another hybrid propellant formulation which has the desired ballistic properties and which has provided sufficient indications of suitable long-term stability includes the nitramine secondary explosive RDX with a binder system including the binders CA and GAP (glycidyl azide polymer), and a suitable plasticizer (e.g., GAP plasticizer, TMETN, ATEC and combinations thereof). Generally, this hybrid propellant formulation may comprise from at least about 70 wt. % and typically between about 70 wt. % and 80% RDX, from about 5 wt. % to about 15 wt. % CA, and from about 5 wt. % to about 15 wt. % GAP, and about 5 wt. % to 15 wt. % plasticizer. These general relative amounts provide the desired ballistic and long-term aging properties for the hybrid propellant. However, it will be appreciated that if propellant grains 90 are to be formed by extrusion from this formulation, refinements of the relative amounts within the noted ranges may be necessary.

In the case of hybrid propellants disclosed herein, as in the case of the double-base and LOVA propellants discussed above, during combustion significant quantities of carbon monoxide and hydrogen are produced (e.g., 35% CO and 19% $H_2$). Again, the formation of carbon monoxide and hydrogen gases through combustion of an inflator propellant would normally be unacceptable for an automotive inflatable safety system. However, when these types of hybrid propellants are used in the hybrid inflator 30 and as noted above, the pressurized medium 36 includes oxygen such that a substantial portion of the carbon monoxide and hydrogen (e.g., 95%) are converted during combustion or as part of a post-combustion reaction to harmless carbon dioxide and water vapor. The use of stored oxygen gas is particularly desirable because it obviates the need to include an oxygen source (e.g., potassium perchlorate) in the hybrid propellant formulation. Moreover, the highly exothermic reaction between the produced combustion gases of the propellant with the stored oxygen is particularly desirable because it enhances the heating value of the propellant, thereby minimizing the amount of propellant required for expanding the air/safety bag.

The hybrid propellants, when formulated into the propellant grains 90 and incorporated into the hybrid inflator 30, may be used in the amounts specified above with regard to the gun-type propellants and specifically including the particulars presented above with regard to the relative amounts of propellant grains 90 and pressurized medium 36. Moreover, the relative amounts of oxygen and the one inert gas for the pressurized medium 36 may also be used in the case of the hybrid propellants disclosed herein.

The following examples further assist in illustrating pertinent features of hybrid propellant formulations which include a secondary explosive and a binder system. As previously noted, all references to "wt. %" refers to weight percentage.

EXAMPLE 4

A hybrid propellant composition comprising at least about 70 wt. % RDX (hexahydrotrinitrotriazine), from about 5 wt. % to about 15 wt. % CA (cellulose acetate), from about 5 wt. % to about 15 wt. % TMETN (trimethylolethane trinitrate) and no more than about 2 wt. % ethyl centralite was prepared and formed into cylindrical grains having an average density of about 1.7132 g/cc. A 10 g test sample was placed into a heavywall bomb chamber and fired into a tank. The test sample had a combustion temperature of about 2578° K. and exhibited acceptable ballistic properties (i.e., a burn rate of 0.47 inches per second (1.18 cm/sec) at 4000 psi (27.6 MPa)). Generally, the performance curves generally approximated those presented in FIGS. 3–4. The gas produced contained about 36% carbon monoxide, about 24% nitrogen, about 19% hydrogen, about 16% water vapor and about 5% carbon dioxide. Long-term thermal stability of the composition was assessed and determined to be acceptable (e.g., the propellant itself was exposed to a temperature of 107° C. for 400 hours and did not ignite; the propellant when contained within a hybrid inflator did not ignite when exposed to a temperature of 107° C. for 400 hours, and thereafter upon activation of the same, the performance of the inflator was substantially unaffected by the heat treatment).

EXAMPLE 5

A propellant composition comprising at least about 70 wt. % RDX (hexahydrotrinitrotriazine), from about 5 wt. % to about 15 wt. % cellulose acetate, and from about 5 wt. % to about 15 wt. % GAP (glycidyl azide polymer) was prepared and formed into cylindrical grains having an average density of about 1.6857 g/cc. A 10 g test sample was placed into a heavywall bomb chamber and fired into a tank. The test sample had a combustion temperature of about 2,357° K. and exhibited acceptable ballistic properties (i.e., a burn rate of 0.48 inches per second (1.18 cm/sec) at 4,000 psi (27.6 MPa)). Generally, the performance curves generally approximated those presented in FIGS. 3–4. The exhaust gas produced contained about 37% carbon monoxide, about 25% hydrogen, about 25% nitrogen, about 10% water vapor and about 3% carbon dioxide. Long term thermal stability of the composition was assessed and determined to be acceptable (e.g., the propellant itself was exposed to a temperature of 107° C. for 400 hours and did not ignite; the propellant when contained within a hybrid inflator did not ignite when exposed to a temperature of 107° C. for 400 hours, and thereafter upon activation of the same, the performance of the inflator was substantially unaffected by the heat treatment).

The foregoing description of the invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known of practicing the invention and to enable others skilled in the art to utilize the invention in such, or other, embodiments and with the various modifications required by the particular applications or uses of the invention. It is intended that the appended claims be construed to include alternative embodiments to the extent permitted by the prior art.

What is claimed is:

1. A method for assembling a hybrid inflator for an automotive inflatable safety system, said hybrid inflator comprising an inflator housing and a gas generator, said method comprising the steps of:

positioning a solid propellant inside said gas generator, said propellant comprising a secondary explosive and a binder system, wherein said solid propellant has a burn rate ranging from about 0.1 inches per second (0.25 cm/sec) to about 1 inch per second (5.0 cm/sec) at 4,000 psi (27.6 MPa), a combustion temperature ranging from about 2,000° K. to about 3,800° K., and has long-term thermal stability;

positioning said gas generator inside said inflator housing;

interconnecting said gas generator and said inflator housing;

introducing a pressurized medium into at least said inflator housing, comprising the steps of:

introducing a first gas into said inflator housing, said first gas consisting essentially of an inert gas;

introducing a second gas into said inflator housing which is different from said first gas, said second gas consisting essentially of oxygen, wherein said pressurized medium consists essentially of a mixture of said first and second gases; and sealing said inflator housing to substantially retain said pressurized medium within said inflator housing.

2. A method, as claimed in claim 1, wherein:

said first gas is argon and said second gas is oxygen, said introducing a first gas step comprises, on a molar basis, introducing about 70% to about 90% of said pressurized medium with said argon, and said introducing a second gas step comprises, on a molar basis, introducing about 10% to about 30% of said pressurized medium with said oxygen.

3. A method, as claimed in claim 1, wherein:

said introducing first and second gas steps are performed separately.

4. A method, as claimed in claim 1, wherein:

said introducing first and second gas steps are performed substantially simultaneously.

5. A method, as claimed in claim 1, further comprising the step of:

mixing a predetermined quantity of said first and second gases before said introducing first and second gas steps, said introducing first and second gas steps thereby being performed simultaneously.

6. A method, as claimed in claim 1, wherein:

said positioning said gas generator step comprising disposing said gas generator concentrically relative to said inflator housing.

* * * * *